United States Patent

Iqbal et al.

[11] Patent Number: 5,932,355
[45] Date of Patent: Aug. 3, 1999

[54] INK-JET RECORDING SHEET

[75] Inventors: Mohammad Iqbal; Donald J. Williams, both of Austin, Tex.; Omar Farooq, Woodbury; David W. Tweeten, Oakdale, both of Minn.

[73] Assignee: Minnesota Mining and Manufacturing Company, St. Paul, Minn.

[21] Appl. No.: 08/798,410

[22] Filed: Feb. 7, 1997

[51] Int. Cl.$^6$ ...................................................... B41M 5/00
[52] U.S. Cl. ........................ 428/447; 428/195; 428/532; 428/535
[58] Field of Search .................... 428/447, 195, 428/532, 535

[56] References Cited

U.S. PATENT DOCUMENTS

| | | | |
|---|---|---|---|
| 3,562,786 | 2/1971 | Bailey et al. | 252/137 |
| 3,682,688 | 8/1972 | Hughes et al. | 117/168 |
| 4,609,479 | 9/1986 | Smeltz | 252/8.551 |
| 4,935,307 | 6/1990 | Iqbal et al. | 428/500 |
| 5,068,140 | 11/1991 | Malhotra et al. | 428/216 |
| 5,075,153 | 12/1991 | Malhotra | 428/207 |
| 5,134,198 | 7/1992 | Stofko, Jr. et al. | 525/205 |
| 5,141,797 | 8/1992 | Wheeler | 428/195 |
| 5,241,006 | 8/1993 | Iqbal et al. | 525/196 |
| 5,277,965 | 1/1994 | Malhotra | 428/216 |
| 5,356,859 | 10/1994 | Lum et al. | 503/227 |
| 5,376,727 | 12/1994 | Iqbal et al. | 525/196 |
| 5,389,723 | 2/1995 | Iqbal et al. | 525/57 |
| 5,429,860 | 7/1995 | Held et al. | 428/195 |

FOREIGN PATENT DOCUMENTS

| | | | |
|---|---|---|---|
| 0583168A2 | 2/1994 | European Pat. Off. | B41M 5/38 |
| 4138288 | 5/1992 | Japan | B41M 5/38 |
| WO 88/06532 | 9/1988 | WIPO | B41M 5/00 |
| WO 96/26841 | 9/1996 | WIPO | B41M 5/00 |
| WO 97/15456 | 5/1997 | WIPO | B41M 5/00 |

OTHER PUBLICATIONS

*Properties of Polymers: Correlations with Chemical Structure*, Van Krevelin et al, Elsevier Publishing Co. (Amsterdam, London, New York, 1972), pp. 294–296.

*Primary Examiner*—Pamela R. Schwartz
*Attorney, Agent, or Firm*—Darla P. Fonseca

[57] ABSTRACT

Ink-receptive compositions of the invention contain a) at least one nonionic silicone surfactant having the formulas:

$$(CH_3)_3SiO(SiO)_x(CH_3SiO)_y Si(CH_3)_3$$
with CH$_3$ and PE substituents or the formula $$(CH_3Si)_{y-2}[(OSi(CH_3)_2)_{x/y}O\text{-PE}$$

wherein x is an integer from about 40 to about 200, and y is an integer from about 3 to about 15, and PE represents the formula $$-CH_2CH_2O(CH_2CH_2O)_m(CH_2CH_2CH_2O)_n Z$$

m being an integer of from 1 to about 40, n having a value of from 0 to about 40 minus m, and Z is hydrogen or an alkyl radical having from about 1 to about 10 carbon atoms, and b) at least one polymer selected from the group consisting of hydroxycellulose and substituted hydroxycellulose polymers, such composition being crosslinkable when coated onto a substrate and subjected to temperatures of at least about 90° C.

18 Claims, No Drawings

INK-JET RECORDING SHEET

FIELD OF THE INVENTION

The invention relates to a composition suitable for use as an ink-jet recording medium, and a recording sheet coated with such composition and subsequently crosslinked, such sheet being suitable for imaging in an ink-jet printer.

DESCRIPTION OF THE ART

Imaging devices such as ink-jet printers and pen plotters are established methods for printing various information including labels and multi-color graphics. Presentation of such information has created a demand for transparent ink receptive imageable receptors that are used as overlays in technical drawings and as transparencies for overhead projection. Imaging with either the ink-jet printer or the pen plotter involves depositing ink on the surface of these transparent receptors. These imaging devices conventionally utilize inks that can remain exposed to air for long periods of time without completely drying. Since it is desirable that the surface of these receptors be dry and non-tacky to the touch soon after imaging, even after absorption of significant amounts of liquid, it is desirable that transparent materials for imaging be capable of absorbing significant amounts of liquid while maintaining some degree of durability and transparency.

Generation of an image by an ink-jet printer results in large quantities of solvent, generally blends of glycols and water, remaining in the imaged areas. Diffusion of this solvent into unimaged areas can result in "bleeding" of the image, when the dye is carried along with the solvent.

U.S. Pat. No. 5,356,859 discloses a dye receiving element useful in thermal dye transfer printing comprising a support having an image receiving layer which comprises a polyoxyalkylene modified dimethylsiloxane graft copolymer. In a preferred embodiment, the polymer is present in an overcoat layer of the element. The purpose of such inclusion is to lessen the tendency of the dye-receiving element to stick to the dye donor during the printing process.

U.S. Pat. No. 5,141,797 discloses opaque ink-jet recording sheets including a water soluble polymeric binder, a titanium chelate crosslinking agent, and an inorganic filler with a high absorption capacity, e.g., silica. The filler is present in a ratio to polymeric binder of from 2:1 to 7:1. Paper substrates are preferred. Only single layer coatings are disclosed.

Liquid-absorbent materials in U.S. Pat. No. 5,134,198 disclose one method to improve drying and decrease dry time. These materials comprise crosslinked polymeric compositions capable of forming continuous matrices for liquid absorbent semi-interpenetrating polymer networks. These networks are blends of polymers wherein at least one of the polymeric components is crosslinked after blending to form a continuous network throughout the bulk of the material, and through which the uncrosslinked polymeric components are intertwined in such a way as to form a macroscopically homogenous composition. Such compositions are useful for forming durable, ink absorbent, transparent graphical materials without the disadvantages of the materials listed above.

WO 8806532 discloses a recording transparency and an aqueous method of preparation. The transparency is coated with a hydroxyethylcellulose polymer or mixture of polymers. The coating solution may also contain a surfactant to promote leveling and adhesion to the surface, and hydrated alumina in order to impart pencil tooth to the surface.

U.S. Pat. No. 5,277,965 discloses a recording medium comprising a base sheet with an ink receiving layer on one surface, and a heat absorbing layer on the other, and an anti-curl layer coated on the surface of the heat absorbing layer. The materials suitable for the ink receptive layer can include hydrophilic materials such as binary blends of polyethylene oxide with, e.g., hydroxypropyl methyl cellulose (Methocel®), hydroxyethyl cellulose, water-soluble ethylhydroxyethyl cellulose, hydroxybutylmethyl cellulose, hydroxypropyl cellulose, methyl cellulose, hydroxyethylmethyl cellulose, vinylmethyl ether/maleic acid copolymers; acrylamide/acrylic acid copolymers, salts of carboxymethylhydroxyethyl cellulose, cellulose acetate; cellulose acetate hydrogen phthalate, hydroxypropyl methyl cellulose phthalate; cellulose sulfate, PVA; PVP, vinylalcohol/vinylacetate copolymers and the like.

U.S. Pat. No. 5,068,140 discloses a transparency comprised of a supporting substrate and an anticurl coating or coatings thereunder. In one specific embodiment, the anticurl coating has two layers. The ink receiving layer in one embodiment is comprised of blends of poly(ethylene oxide), mixtures of poly(ethylene oxide) with celluloses such as sodium carboxymethyl cellulose, hydroxymethyl cellulose and a component selected from the group consisting of (1) vinylmethyl ether/maleic acid copolymer; (2) hydroxypropyl cellulose; (3) acrylamide/acrylic acid copolymer, (4) sodium carboxymethylhydroxyethyl cellulose; (5) hydroxyethyl cellulose; (6) water soluble ethylhydroxyethyl cellulose; (7) cellulose sulfate; (8) poly(vinylalcohol); (9) polyvinylpyrrolidone; (10) poly(acrylamido 2-methyl propane sulfonic acid); (11) poly(diethylenetriamine-co-adipic acid); (12) poly(imidazoline) quaternized; (13) poly(N,N-methyl-3-S dimethylene piperidinium) chloride; (14) poly(ethylene imine)epichlorohydrin modified; (15) poly(ethylene imine) ethoxylated; blends of poly($\alpha$-methylstyrene) with a component having a chlorinated compound.

U.S. Pat. No. 5,141,797, discloses ink-jet papers having crosslinked binders, and opaque sheets. The opacity is achieved by using a paper stock, and by including an inorganic filler in the coated layer. A titanium chelate cross linking agent is also disclosed. Tyzor® TE is specifically mentioned. Three other patents disclose the generic use of titanium compounds as cross-linking agents, i.e., U.S. Pat. Nos. 4,609,479, 3,682,688, and 4,609,479. Binder polymers, including gelatin materials, are disclosed, as is use of a mordant.

U.S. Pat. No. 5,429,860 discloses an ink/media combination, with a purpose to arrive at a superior final copy by designing the ink to match the film, and vice-versa. An external energy source is used to effect a fix step after the ink has been brought in contact with the medium. At least one multivalent metal salt, Tyzor® 131, is disclosed, as are generic organic titanates.

EP 0 583168A2 discloses an offset printing method wherein the inkjet ink is deposited on a rotating roll and then transferred to a receptor sheet at a subsequent point on the rotation. The roll is coated with a surfactant to aid deposition and release; a broad range of surfactants are disclosed, including silicone surfactants.

U.S. Pat. No. 5,075,153 discloses a "never-tear" coated paper having a plastic substrate and a binder layer comprising a copolymer selected from hydoxypropyl cellulose, poly(vinyl alkyl ether), vinyl pyrrolidone-vinyl acetate polymer, vinyl pyrrolidone-dialkyamino ethyl methacrylate copolymer quaternized, poly(vinyl pyrrolidone), poly (ethylene imine) and mixtures thereof; a pigment and an ink receiving polymer layer.

U.S. Pat. No. 3,562,786 discloses silicone surfactants and methods of making the surfactant. The water solubility of the silicone is improved by mixing with a cationic detergent.

The present inventors have now discovered that ink jet films using an ink-receptive composition comprising certain nonionic silicone surfactants, ink-receptive polymers and cellulosic polymers, provides high density images which are tack-free and permanent, and which have substantially no color bleed, while drying very quickly.

SUMMARY OF THE INVENTION

The invention provides a composition suitable for use on an ink-jet recording sheet, an ink-jet recording sheet having said composition coated onto at least one major surface, and an ink-jet recording sheet having a single layer or two layer coating structure.

Ink receptive compositions of the invention comprise:
a) at least one nonionic polyoxyalkylene modified polymethyl siloxane surfactant having the formula:

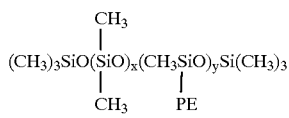

wherein x is an integer from about 40 to about 200, and y is an integer from about 3 to about 15, and PE represents the formula

wherein m is an integer of from 1 to about 40, and n is an integer of from 0 to 40 minus m, and Z is hydrogen or an alkyl radical having from about 1 to about 10 carbon atoms, and b) at least one polymer selected from the group consisting of hydroxycellulose and substituted hydroxycellulose polymers, such composition being crosslinkable when coated onto a substrate and subjected to temperatures of at least about 90° C.

In another embodiment, ink-receptive compositions of the invention comprise:
a) at least one nonionic polyoxyalkylene modified polymethyl siloxane surfactant having the formula:

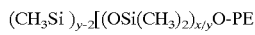

wherein x is an integer from about 40 to about 200, and y is an integer from about 3 to about 15, and PE represents the formula

wherein m is an integer of from 1 to about 40, and n is an integer of from 0 to 40 minus m (40 minus m), and Z is hydrogen or an alkyl radical having from about 1 to about 10 carbon atoms, and b) at least one polymer selected from the group consisting of hydroxycellulose and substituted hydroxycellulose polymers, such composition being crosslinkable when coated onto a substrate and subjected to temperatures of at least about 90° C.

Ink-jet recording sheets of the invention comprise a film substrate having two major surfaces, at least one major surface having coated thereon an ink-receptive composition comprising from about 0.05% to about 6% of at least one polyoxyalkylene modified silicone having the following formula:

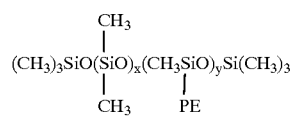

wherein x is an integer from about 40 to about 200, and y is an integer from about 3 to about 15, and PE represents the formula

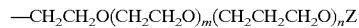

wherein m is an integer of from 1 to about 40, and n is an integer of from 0 to 40 minus m, and Z is hydrogen or an alkyl radical having from about 1 to about 10 carbon atoms, from about 14% to about 93% of at least one polymer selected from the group consisting of hydroxycellulose and substituted hydroxycellulose polymers, and from 0 to about 10% of an additional ink-receptive polymer, said composition having been crosslinked on said substrate by means of heating.

Alternative ink-jet recording sheets of the invention comprise the branched silicone surfactant having the formula

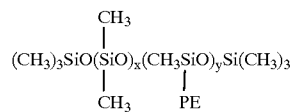

in place of the linear surfactant above, wherein x is an integer from about 40 to about 200, and y is an integer from about 3 to about 15.

Preferred ink-jet recording sheets of the invention comprise an inkjet recording sheet, comprising a two-layer imageable coating comprising:
a) an absorptive bottom layer comprising at least one crosslinkable polymeric component, and
b) an optically clear top layer comprising at least one polyoxyalkylene modified dimethylsiloxane surfactant having the following formula:

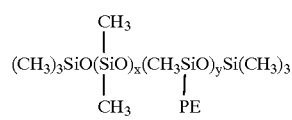

wherein x is an integer from about 40 to about 200, and y is an integer from about 3 to about 15, PE represents the formula

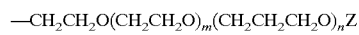

wherein m is an integer of from 1 to about 40, and n is an integer of from 0 to 40 minus m, and Z is hydrogen or an alkyl radical having from about 1 to about 10 carbon atoms, said top layer having been crosslinked on said substrate by heat.

Particularly preferred ink-jet recording sheets have two-layer coatings comprising:
a) an absorptive bottom layer formed from monomers comprising
  i) at least one crosslinkable polymeric component;
  ii) at least one liquid-absorbent component comprising a water-absorbent polymer, and iii) from 0 to about 5% of a crosslinking agent,
b) an optically clear top layer comprising
  i) from about 0.05% to about 6% of at least one silicone surfactant having the following formula:

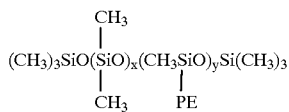

wherein x is an integer from about 40 to about 200, and y is an integer from about 3 to about 15, and PE represents the formula

wherein m is an integer of from 1 to about 40, and n is an integer of from 0 to 40 minus m, and Z is hydrogen or an alkyl radical having from about 1 to about 10 carbon atoms, and
  ii) from about 14% to about 94% of a hydroxycellulose or substituted hydroxycellulose polymer,
at least one of said layers further comprising from about 0.5% to about 10% of an additional ink-receptive polymer, said coating having been crosslinked on a substrate by application of heat.

In one preferred embodiment, the two-layer coating comprises:
a) an absorptive bottom layer formed from monomers comprising
  i) at least one crosslinkable polymeric component;
  ii) at least one liquid-absorbent component comprising a water-absorbent polymer, and
  iii) from 0 to about 5% of a crosslinking agent,
b) an optically clear top layer comprising
  i) from about 0.05% to about 6% of at least one silicone surfactant having the following formula:

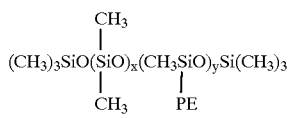

wherein x is an integer from about 40 to about 200, and y is an integer from about 3 to about 15, and PE represents the formula

wherein m is an integer of from 1 to about 40, and n is an integer of from 0 to 40 minus m, and Z is hydrogen or an alkyl radical having from about 1 to about 10 carbon atoms, and
  ii) from about 14% to about 93% of a hydroxycellulose or substituted hydroxycellulose polymer, and
  iii) from 0 to about 80% of a metal chelate wherein said metal is selected from the group consisting of titanium, aluminum and zirconium,
said coating having been crosslinked on a substrate by application of heat.

The following terms have these meanings as used herein:
1. The term "semi-interpenetrating network" means an entanglement of a homocrosslinked polymer with a linear uncrosslinked polymer.
2. The term "SIPN" refers to a semi-interpenetrating network.
3. The term "mordant" means a compound which, when present in a composition, interacts with a dye to prevent diffusion through the composition.
4. The term "crosslinkable" means capable of forming covalent or strong ionic bonds with itself or with a separate agent added for this purpose.
5. The term "hydrophilic" is used to describe a material that is generally receptive to water, either in the sense that its surface is wettable by water or in the sense that the bulk of the material is able to absorb significant quantities of water. Materials that exhibit surface wettability by water have hydrophilic surfaces. Monomeric units will be referred to as hydrophilic units if they have a water-sorption capacity of at least one mole of water per mole of monomeric unit.
6. The term "hydrophobic" refers to materials which have surfaces not readily wettable by water. Monomeric units will be referred to as hydrophobic if they form water-insoluble polymers capable of absorbing only small amounts of water when polymerized by themselves.
7. The term "surfactant" means a compound which reduces surface tension, thereby increasing surface wetting.
8. The term "silicone surfactant" means a surfactant containing at least one Si atom.
9. The term "optically clear" means that the majority of light passing through does not scatter.
10. The term "chelate" means a coordination compound in which a central metal ion is attached by coordinate links to two or more nonmetal ligands, which form heterocyclic rings with the metal ion being a part of each ring.
11. The term "phase separation" refers to a solution or mixture having at least two physically distinct regions.

All parts, percents and ratios herein are by weight, unless specifically stated otherwise.

DETAILED DESCRIPTION OF THE INVENTION

Compositions of the invention are suitable for coating onto ink-jet recording sheets. Such compositions are crosslinkable with the application of heat, and comprise at least one silicone surfactant having a hydrophilic portion and a hydrophobic portion, and at least one cellulosic material selected from the group consisting of hydroxycellulose and substituted hydroxycellulose polymers, such composition being crosslinkable when coated onto a substrate and subjected to temperatures of at least about 90° C. The layer also contains a small amount of an additional ink-receptive polymer.

Silicone surfactants useful in compositions of the invention are those having at least a weakly hydrophilic portion and a hydrophobic portion. Useful surfactants include two differing structures of polyalkylene oxide-modified polydimethylsiloxanes. Useful surfactants include those linear type surfactants having the following formula:

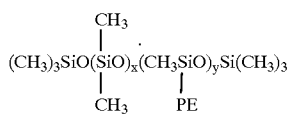

wherein x is an integer from about 40 to about 200, and y is an integer from about 3 to about 15, and PE represents the formula

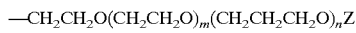
—CH$_2$CH$_2$O(CH$_2$CH$_2$O)$_m$(CH$_2$CH$_2$CH$_2$O)$_n$Z wherein m is an integer of from 1 to about 40, and n is an integer of from 0 to 40 minus m, and Z is hydrogen or an alkyl radical having from 1 to about 10 carbon atoms. Thus, the surfactant may comprise only ethylene oxide groups, propylene oxide groups or a mixture thereof.

Also useful are branched surfactants having the formula:

(CH$_3$Si)$_{y-2}$[(OSi(CH$_3$)$_2$)$_{x/y}$O-PE where x, y, m, n, Z and PE are defined identically to the linear surfactant.

Commercially available silicone surfactants include those available from Union Carbide under the trade name Silwet®, e.g., Silwet® L-77, Silwet®L-720, Silwet®L-722, and the "7600" series, such as Silwet® 7614, and the "7000" series, e.g., Silwet®L-7001, 7002, 7200, 7210, and the like, all of which can be described as polyalkyleneoxide modified polydimethylsiloxanes.

Preferred silicone surfactants are those having a strongly hydrophilic end and a strongly hydrophobic end. The hydrophobic end allows effective blooming to the surface of the coated layer, and the hydrophilic end provides a high surface energy moiety which interacts with water-based inks to give uniform deposition and therefore higher image density, i.e., brighter images. Also preferred are silicone surfactants containing only ethylene oxide groups, i.e., surfactants of the above formulae where n is zero (0). These surfactants include those available as the "7600" series.

Image uniformity on a micro and macro scale is considered an important characteristic. It can be shown that, for a given quantity of pigment or dye per unit area, light absorption is maximized if the said pigment or dye is uniformly distributed over that area. (Light Absorption is usually presented as Density, the two measures being calculated in the same manner, i.e., Log$_{10}$ (incident light/transmitted light)—the selection of the particular nomenclature relates to the geometry of the measuring instrument.)

Compositions show improvement in image density when even extremely small amounts of the silicone surfactants are used. Further, amounts up to 10% continue to show improvement; however, use of higher amounts of surfactant can cause haze. Compositions of the invention therefore typically comprise from about 0.01% to about 10% of the surfactant, preferably from about 0.05% to about 6%.

Although not wishing to be bound by theory, it is believed that the nonionic silicone surfactant blooms to the surface after coating. This provides improved optical density properties, as well as allowing the hydrophilic portion of the surfactant to convey the large ink-drops used in ink-jet imaging through the layer where it can be absorbed. If the composition were crosslinked prior to coating, the surfactant would be trapped within the crosslinked network, requiring a much higher concentration in order for any to be present on the surface.

The compositions comprise at least about 14% to about 94% of at least one hydroxycellulose polymer. Useful hydroxycellulosic materials include hydroxymethylcellulose, hydroxypropylcellulose, hydroxyethyl-cellulose and the like.

The composition may comprises one or more additional water-absorbing, hydrophilic, polymeric materials. Sorption capacities of various monomeric units are given, for example, in D. W. Van Krevelin, with the collaboration of P. J. Hoftyzer, *Properties of Polymers: Correlations with Chemical Structure,* Elsevier Publishing Company (Amsterdam, London, New York, 1972), pages 294–296.

When such addition is desired, useful additional ink-receptive polymers are preferably at least somewhat incompatible with the hydroxycellulose or hydroxymethylcellulose polymer. This includes many, if not most, water soluble polymers. Useful examples include poly (vinylalcohol) and poly(vinylpyrrolidone), partially hydrolyzed poly(vinyl alcohol) poly(vinyl pyrrolidone-co-vinyl acetate), polyvinylpyridinium halide, polyvinylmethylethers, polyacrylamide, gelatin, polymeric emulsions thereof, and blends thereof. Commercially available examples include Airvol® 520, and Gohsehnol® KPO, both poly(vinylalcohol)s, and "Copolymer 958", a poly (vinylpyrrolidone/dimethylaminoethyl methacrylate), available from GAF Corporation, and the like.

Without wishing to be bound by theory, it is believed that additional polymers facilitate an inhomogeneity, perhaps even a phase separation when added in small amounts which will not otherwise substantially affect the imaging characteristics.

The polymeric blend may also include a hydrophobic polymeric material preferably derived from a combination of acrylic or other hydrophobic ethylenically unsaturated monomeric units copolymerized with monomeric units having acid functionality. The hydrophobic monomeric units are capable of forming water-insoluble polymers when polymerized alone, and contain no pendant alkyl groups having more than 10 carbon atoms. They also are capable of being copolymerized with at least one species of acid-functional monomeric unit.

When present, preferred hydrophobic monomeric units are preferably selected from certain acrylates and methacrylates, e.g., methyl(meth)acrylate, ethyl(meth) acrylate, acrylonitrile, styrene or a-methylstyrene, and vinyl acetate. Preferred acid functional monomeric units for polymerization with the hydrophobic monomeric units are acrylic acid and methacrylic acid in amounts of from about 2% to about 20%.

The coating may be in the form of a semi-interpenetrating network (SIPN). The SIPN is a continuous network wherein the crosslinked polymer forms a continuous matrix, as disclosed in U.S. Pat. Nos. 5,389,723, 5,241,006, 5,376,727.

The composition is not crosslinked prior to coating onto the sheet, but is coated as the uncrosslinked composition described supra and after coating, crosslinks when dried with application of heat. This is typically done in a drying oven or other controlled temperature facility.

The single layer, or two layer system may also comprise a metal chelate. Useful metal chelates include titanate chelates, zirconate chelates and aluminum chelates. Such chelates typically do not undergo immediate hydrolysis when mixed with crosslinkable materials, but will remain unreactive unless activated by raising the temperature which causes the structure of the chelate to begin breaking down. The exact temperature required will depend on the activity of the other ingredients with which the chelate is mixed, and the functional groups on the metal chelate. Useful functional groups include esters, amines, acetonates, and the like, e.g., triethanolamine metal chelates and acetyl acetonate chelates. Chelates containing aluminum and titanate are preferred, with triethanolamine titanate chelates being highly preferred.

It is believed that the metal chelates do not undergo solvolysis when combined with the other ingredients, but rather begin to crosslink when heated during film drying. The chelates provide titanate metal ions which are then complexed with a hydroxycellulose material, and are converted to the corresponding metal oxide or hydroxide in the cellulose matrix. The metal ions then undergo further reaction with the alkanolamine which regenerates the titanate alkanolamine chelates in hydroxylate form. The solvolysis profile is shown below:

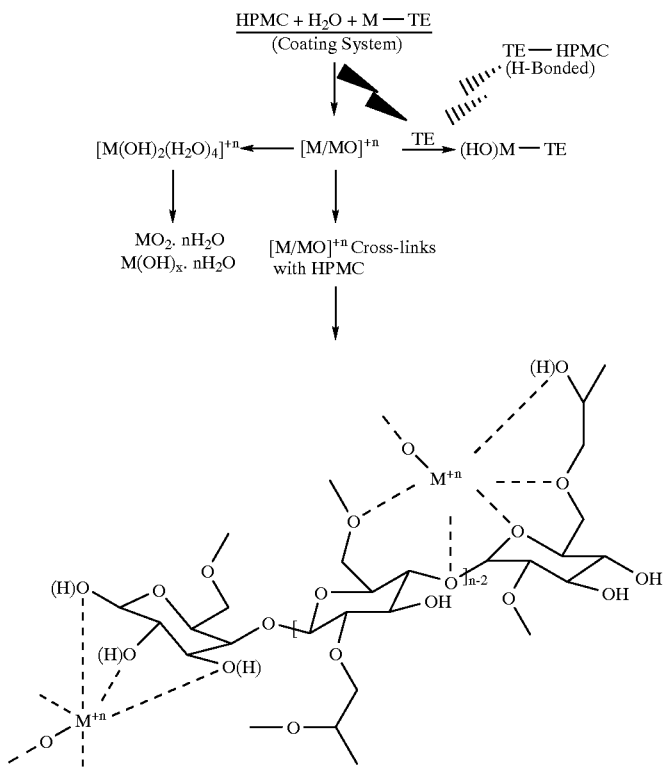

Commercially available chelates include triethanolamine titanate chelates, available as Tyzor® TE; ethyl acetoacetate titanate chelate, Tyzor® DC; lactic acid titanate chelate, Tyzor® LA and acetylacetonate titanate chelate, Tyzor® GBA, available from E.I. DuPont de Nemours (DuPont).

When used, single layer coatings of the invention or top layers of two-layer coating systems comprise from about 5% to about 80% of the metal chelate, preferably from about 5% to about 35% percent.

The composition may also comprise a mordant for reduction of ink fade and bleed. When present, the mordant preferably comprises from about 1 part by weight to 20 parts by weight of the solids, preferably from about 3 parts by weight to 10 parts by weight. Useful mordants include polymeric mordants having at least one guanidine functionality.

Such single layer coatings may also include additional adjuvants such as mordants, polymeric microspheres, anti-curling agents such as polyethylene glycols, and the like.

In one embodiment, ink-jet recording sheets of the invention comprise a substrate having a single layer coated on at least one major surface which comprise(s) the essential ingredients of compositions of the invention. That is, single-layer compositions are compositions comprising at least one silicone surfactant having a hydrophilic portion and a hydrophobic portion, at least one cellulose material selected from the group consisting of hydroxycellulose and substituted hydroxycellulose polymers, and at least one additional ink-receptive polymer. The additional ink-receptive polymer is used in relatively small amounts, e.g., from about 0.5% to about 10%, preferably under 5%.

Preferred single-layer ink-jet recording sheets of the invention comprise from about 0.05% to about 6% percent of a silicone surfactant, from about 14% to about 93% of at least one cellulosic polymer selected from the group consisting of hydroxycellulose and substituted hydroxycellulose polymers, such as hydroxyethyl cellulose, hydroxypropylmethylcellulose and the like, from about 5% to about 35% of a metal chelate, and from 0.5% to about 10% of the additional ink-receptive polymer.

Highly preferred ink-jet recording sheets of the invention comprise a two-layer coating system including an optically clear top layer, and an ink-absorptive underlayer.

In such systems, the absorptive underlayer has a composition comprising at least one water-absorbing hydrophilic polymeric material, and preferably at least one crosslinkable material. The water-absorbing hydrophilic polymeric material comprises homopolymers or copolymers of monomeric units selected from vinyl lactams, alkyl tertiary amino alkyl acrylates or methacrylates, alkyl quaternary amino (meth) acrylates, 2-vinylpyridine and 4-vinylpyridine. Polymerization of these monomers can be conducted by known free-radical techniques.

Hydrophobic polymeric materials are preferably derived from combinations of acrylic or other hydrophobic ethylenically unsaturated monomeric units copolymerized with monomer units having acid functionality. The hydrophobic monomeric units should be capable of forming water-insoluble polymers, and contain no pendent alkyl groups having more than ten carbon atoms. They may be polymerized alone, or copolymerized with at least one species of acid-functional monomeric units.

In a preferred embodiment, the underlayer is a semi-interpenetrating network. The SIPN of the present invention comprises crosslinkable polymers that are either hydrophobic or hydrophilic in nature and can be derived from the copolymerization of ethylenically unsaturated monomer units having acidic groups, such as acrylic monomers, or if pendent ester groups are already present, by hydrolysis. The SIPNs are continuous networks wherein the crosslinked polymer forms a continuous matrix, as disclosed in U.S. Pat. Nos. 5,389,723, and 5,376,727; incorporated herein by reference.

SIPNs useful for forming underlayers of the present invention comprise from about 25 to about 99 weight percent crosslinkable polymer, preferably from about 30 to about 60 weight percent. The liquid absorbent component can therefore comprise from about 1 to about 75 weight percent, preferably from about 40 to about 70 weight percent of the total SIPN.

The crosslinking agent for such an SIPN layer is preferably selected from the group of polyfunctional aziridines possessing at least two crosslinking sites per molecule, such as trimethylol propane-tris-(β-(N-aziridinyl)propionate)

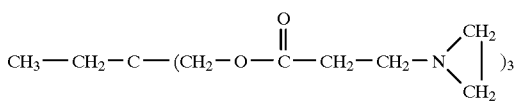

pentaerythritol-tris-(β-(N-aziridinyl)propionate),

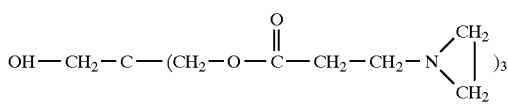

trimethylolpropane-tris-(β-(N-methylaziridinyl propionate)

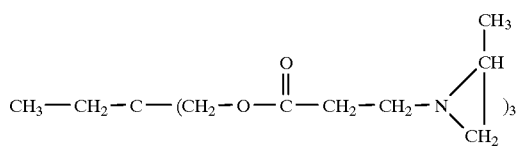

and so on. When used, the crosslinking agent typically comprises from about 0.5 to 6.0 percent crosslinking agent, preferably from about 1.0 to 4.5 percent.

The top layer is an optically clear, thin layer comprising at least one silicone surfactant having a hydrophilic portion and a hydrophobic portion, and at least one cellulosic material selected from hydroxycellulose and substituted hydroxycellulose polymers. This top layer comprises from about 0.05% to about 10% of the nonionic surfactant, with the same surfactants being preferred as those described for the single layer coating.

The top layer further comprises at least about 14% to about 94% of at least one hydroxycellulose polymer, (93% when an additional ink-receptive polymer is contained in this layer). Useful hydroxycellulosic materials include hydroxymethyl-cellulose, hydroxypropylcellulose, hydroxyethyl-cellulose and the like. Such materials are available commercially, e.g., as Methocel® series denoted A, E, F, J, K, e.g., Methocel® F-50, Methocel® A4M, and the like from Dow Chemical Company.

At least one layer of the system may also contain from about 0.5% to about 10%, preferably to about 5% of one or more additional ink-receptive polymers, described supra.

The top layer may also includes particulates, such as polymeric microspheres or beads, which may be hollow or solid, for the purpose of improving handling and flexibility. Preferred particulate materials are formed form polymeric materials such as poly(methylmethacrylate), poly(stearyl methacrylate) hexanedioldiacrylate copolymers, poly(tetrafluoroethylene), polyethylene; starch and silica. Poly(methylmethacrylate) beads are most preferred. Levels of particulate are limited by the requirement that the final coating be transparent with a haze level of 15% or less, as measured according to ASTM D1003-61 (Reapproved 1979). The preferred mean particle diameter for particulate material is from about 5 to about 40 micrometers, with at least 25% of the particles having a diameter of 15 micrometers or more. Most preferably, at least about 50% of the particulate material has a diameter of from about 20 micrometers to about 40 micrometers.

The formulations can be prepared by dissolving the components in a common solvent. Well-known methods for selecting a common solvent make use of Hansen parameters, as described in U.S. Pat. No. 4,935,307, incorporated herein by reference.

The single layer or two layer coatings can be applied to the film substrate by any conventional coating technique, e.g., deposition from a solution or dispersion of the resins in a solvent or aqueous medium, or blend thereof, by means of such processes as Meyer bar coating, knife coating, reverse roll coating, rotogravure coating, and the like. The base layer is preferably coated to a thickness of from about 0.5 μm to about 20 μm, and the top layer preferably has a thickness of from about 0.5 μm to about 10 μm.

Drying of the layers can be effected by conventional drying techniques, e.g., by heating in a hot air oven at a temperature appropriate for the specific film substrate chosen. However, the drying temperature must be at least about 90° C., preferably at least about 120° C. in order to crosslink the metal chelate and form the colloidal gel with the hydroxycellulose polymer.

Additional additives can also be incorporated into either layer to improve processing, including thickeners such as xanthan gum, catalysts, thickeners, adhesion promoters, glycols, defoamers, antistatic materials, and the like. Likewise, additives such as the mordant, may be present in the top layer rather than the base layer or in both layers. An additive which may be present in the underlayer to control curl is a plasticizing compound. Useful compounds include, e.g., low molecular weight polyethylene glycols, polypropylene glycols, or polyethers; for example PEG 600, Pycal® 94, and Carbowax® 600.

Film substrates may be formed from any polymer capable of forming a self-supporting sheet, e.g., films of cellulose esters such as cellulose triacetate or diacetate, polystyrene, polyamides, vinyl chloride polymers and copolymers, polyolefin and polyallomer polymers and copolymers, polysulphones, polycarbonates and polyesters. Suitable polyester films may be produced from polyesters obtained by condensing one or more dicarboxylic acids or their lower alkyl diesters in which the alkyl group contains up to about 6 carbon atoms, e.g., terephthalic acid, isophthalic, phthalic, 2,5-, 2,6-, and 2,7-naphthalene dicarboxylic acid, succinic acid, sebacic acid, adipic acid, azelaic acid, with one or more glycols such as ethylene glycol, 1,3-propanediol, 1,4-butanediol, and the like.

Preferred film substrates are cellulose triacetate or cellulose diacetate, polyesters, especially poly(ethylene terephthalate), and polystyrene films. Poly(ethylene terephthalate) is most preferred. It is preferred that film substrates have a caliper ranging from about 50 micrometers to about 125 micrometers. Film substrates having a caliper of less than about 50 micrometers are difficult to handle using conventional methods for graphic materials. Film substrates having calipers over 125 micrometers are very stiff, and present feeding difficulties in certain commercially available ink-jet printers and pen plotters.

When polyester or polystyrene film substrates are used, they are preferably biaxially oriented, and may also be heat set for dimensional stability during fusion of the image to the support. These films may be produced by any conventional method in which the film is biaxially stretched to impart molecular orientation and is dimensionally stabilized by heat setting.

To promote adhesion of the underlayer to the film substrate, it may be desirable to treat the surface of the film substrate with one or more primers, in single or multiple layers. Useful primers include those known to have a swelling effect on the film substrate polymer. Examples include halogenated phenols dissolved in organic solvents. Alternatively, the surface of the film substrate may be modified by treatment such as corona treatment or plasma treatment.

The primer layer, when used, should be relatively thin, preferably less than 2 micrometers, most preferably less than 1 micrometer, and may be coated by conventional coating methods.

Transparencies of the invention are particularly useful in the production of imaged transparencies for viewing in a transmission mode, e.g., in association with an overhead projector.

The following examples are for illustrative purposes, and do not limit the scope of the invention, which is that defined by the claims.

Test Methods

Image Density

The transmissive image density is measured by imaging the color desired, and measuring using a Macbeth TD 903 densitometer with the gold and status A filters. Black image density is evaluated by measuring the density of a solid fill black rectangle image.

Dry Time

The environmental conditions for this test are 70° C. and 50% relative humidity (RH). The print pattern consists of solid fill columns of adjacent colors. The columns are 0.64 cm to 1.27 cm wide, and 15–23 centimeters long. After printing the material is placed on a flat surface, then placed in contact with bond paper. A 2 kg rubber roller 6.3 cm wide is then twice rolled over the paper. The paper is then removed, and the dry time, $D_T$, is calculated by using the following formula:

$$D_T = T_D + (L_T/L_P)T_P$$

where $T_D$ is the length of time between the end of the printing and placing the image in contact with the bond paper; $L_T$ is the length of image transfer to paper; $L_P$ is the length of the printed columns; and $T_P$ is the time of printing.

Model Density Experiments

The model experiments cited below explain the importance of image density uniformity.

Model Density Experiment 1

A light absorbing layer has sufficient pigment to adsorb all of the incident light, and that pigment is uniformly distributed. Now if a small amount of the pigment—say 10%—is redistributed to leave 10% of the area pigmentless, the layer will now transmit 10% of the incident light—a significant fraction. The Density or Light Absorption will have fallen from a very high (say greater than 5 or even infinite) value to a value of 1.0. This would not be considered a high value for use on an overhead projector, as an area having a value of 1.0 for density can easily be distinguished by the human eye from an area having an infinite density.

Model Density Experiment 2

A light absorbing layer contains sufficient uniformly-distributed dye to yield a Density of 1.0 at a wavelength of 550 nm: that is, 90% of the incident light, of wavelength 550 nm, is absorbed, and 10% is transmitted. A second layer having overall the same dye amount per unit area, has only half of its area covered. The uncovered area will have a Density of 0.0, and the covered area, having twice the dye concentration per unit area as the uniformly-distributed first layer, will have a Density of 2.0. Evaluating the entire area, half the area will allow 100% of the light through, and half the area will allow only 1.0% of the light through. Thus the total light transmitted will be (0.5*1.0)+(0.5*0.01)=0.505, and the resultant Density will be $Log_{10}$ (1.0/0.505)=0.297 (Incident light is taken as 1.0). Thus by redistibuting the dye, the density has fallen to 30% of its previous value.

EXAMPLES

1–12, 14–16 and Comparative Examples C13 and C14

A layer having the underlayer composition listed in Table 1 was coated onto a polyvinylidiene chloride primed polyester substrate (substrate thickness-100 μm) by continuous slot coating to give a dry coating weight of 8 g/m², and after being allowed to dry for 2 minutes. Copolymer 958 is a PVP/DMAEMA composition. Pycal® 94 is a Poly(oxy-1, 2-ethanediyl) phenyl ether with a CAS Registry Number of 62046-66-6, Methocel® F50 is a hydroxypropyl methyl cellulose manufactured by The Dow Chemical Company. The polyvinyl alcohol (PVA) blend is a mixture of Airvol® 520 and Gohsehnol® KPO-6, both polyvinyl alcohols. XAMA® 7 is pentaerythritol tris(3-aziridinopropionate), CAS Registry Number 57116-45-7, and the mordant has the chemical formula:

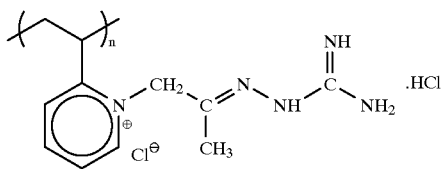

wherein n is 2 or greater.

TABLE 1

| Copolymer 958 | 51.76% dry weight |
| --- | --- |
| Pycal ® 94 | 7.76 |
| Mordant | 3.76 |
| Methocel ® F50 | 1.71 |
| PVA blend | 34.51 |
| XAMA ® 7 | 0.50 |
| Total | 100.0% |

A series of coatings was then made by overcoating the above composition to a coating weight of between 0.2 and 0.5 g/sq ft. The composition of the overcoating solution was 99.8% Methocel® P50, and 0.2% surfactant. Certain variation in initial density may be due to manual coating methods used rather than more uniform production coating methods. The surfactants used are given in Column 1 of Table 2 below; and the results of testing in columns 2–3.

The coatings were tested by imaging each sheet separately on an Epsom Stylus Color Printer model ESC "P2". Results listed in Columns 2 and 3 show respectively, the optical transmission densities to white light immediately after imaging, (column 2), and after 24 hours shelf storage (Column 3). Each data point is the average of 3 separate density measurement taken at different points on the sample. It is apparent that the addition of the Silwet® range of surfactants is producing a marked improvement in density over the control which has no surfactant present.

In addition to the Silwet® range of surfactants, certain other surfactants were included in the screening test. Dow "XUR" is a proprietary surfactant, manufactured by The Dow Chemical Corporation. It has the CAS designation RN 7732-18-5. Microbond® 1010 is supplied by the DeTer Company of Harrodsburg, Ky., has the CAS Registry Number 68439-57-6, and is a mixture of non-ionic and anionic surfactants. Note that these coatings containing these surfactants did not show improvement over the control. Experimental error in the Density measurements + or −0.02.

TABLE 2

| Example No./ Silicone Surfactant | | Initial density | Final density |
|---|---|---|---|
| Ex 1 | L-7602 | 0.62 | 0.76 |
| Ex 2 | L-7600 | 0.69 | 0.80 |
| Ex 3 | L-7210 | 0.67 | 0.78 |
| Ex 4 | L-7500 | 0.64 | 0.73 |
| Ex 5 | L-7633 | 0.67 | 0.75 |
| Ex 6 | L-7604 | 0.65 | 0.72 |
| Ex 7 | L-7607 | 0.77 | 0.83 |
| Ex 8 | L-7605 | 0.70 | 0.75 |
| Ex 9 | L-7614 | 0.70 | 0.75 |
| Ex 10 | L-722 | 0.68 | 0.72 |
| Ex 11 | L-7001 | 0.66 | 0.68 |
| Ex 12 | L-7002 | 0.66 | 0.68 |
| Ex C13 | "XUR" | 0.59 | 0.61 |
| Ex C14 | Microbond ® 1010 | 0.64 | 0.64 |
| Ex C15 | L-7230 | 0.68 | 0.67 |
| Ex C16 | L-77 | 0.72 | 0.70 |
| Control | (none) | 0.65 | 0.64 |

EXAMPLE 17

The surfactant Silwet® L-7607 was selected for further examination. It was tested in the manner outlined in Example 1 above. The concentration of this component was varied from zero, as in the control, to 10% dry weight of the second coating.

The results of testing these coatings is given in Table 3. Column 1 lists the dry weight % of the surfactant in the second coating, Columns 2, 3 and 4 give measurements made in an identical manner to those in the corresponding columns in Table 2.

It may be seen that on average, any amount of silicone surfactant, in the range given, produces a beneficial effect on the final image density when compared to the control. Not only are these materials producing beneficial effects, but are able to do so in very small amounts, giving valuable results with considerable economy.

It should also be observed that there is a considerable improvement in initial reported densities when compared to the initial value for the no-surfactant case. This improvement averages 0.09 density units, and a further 0.04 is gained over the 24 hours separating initial evaluations.

TABLE 3

| % Concentration dry | Initial | Final | Delta |
|---|---|---|---|
| 0 | 0.65 | 0.64 | −0.01 |
| 0.2 | 0.77 | 0.83 | 0.06 |
| 1 | 0.70 | 0.72 | 0.02 |
| 2 | 0.74 | 0.77 | 0.03 |
| 3 | 0.78 | 0.84 | 0.06 |
| 4 | 0.76 | 0.75 | −0.01 |
| 5 | 0.72 | 0.75 | 0.03 |
| 10 | 0.73 | 0.79 | 0.06 |

What is claimed is:

1. An ink-jet recording sheet comprising a film substrate having two major surfaces, at least one major surface bearing thereon a coating comprising a nonionic polyalkylene oxide-modified polydimethyl siloxane surfactant having the following formula:

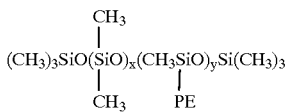

wherein x is an integer from about 40 to about 200, and y is an integer from about 3 to about 15, and PE represents the formula

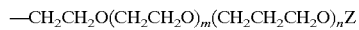

wherein m is an integer of from 1 to about 40, and n is an integer of from 0 to 40 minus m and Z is hydrogen or an alkyl radical having from about 1 to about 10 carbon atoms, and at least one polymer selected from the group consisting of hydroxycellulose and substituted hydroxycellulose polymers, said composition having been crosslinked on said film substrate by application of heat.

2. An ink-jet recording sheet according to claim 1 wherein n is 0.

3. An ink-jet recording sheet according to claim 1 wherein said hydroxycellulose is selected from the group consisting of hydroxypropylmethylcellulose and hydroxypropylethylcellulose.

4. An ink-jet recording sheet according to claim 1 wherein said film substrate is transparent.

5. An ink-jet recording sheet comprising a film substrate having two major surfaces, at least one major surface bearing thereon a coating comprising a nonionic polyalkylene oxide-modified polydimethyl siloxane surfactant having the following formula:

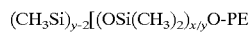

wherein x is an integer from about 40 to about 200, and y is an integer from about 3 to about 15, PE represents the formula

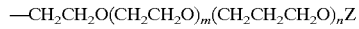

wherein m is an integer of from 1 to about 40, and n is an integer of from 0 to 40 minus m and Z is hydrogen or an alkyl radical having from about 1 to about 10 carbon atoms, and at least one polymer selected from the group consisting of hydroxycellulose and substituted hydroxycellulose polymers, said composition having been crosslinked on said film substrate by application of heat.

6. An ink-jet recording sheet according to claim 5 further comprising from about 5% to about 35% of a metal chelate wherein said metal is selected from the group consisting of titanium, aluminum and zirconium.

7. An ink-jet recording sheet comprising a substrate having coated on at least one major surface thereof a two-layer coating comprising:
   a) an absorptive bottom layer comprising
      i) from about 25% to about 99% of one crosslinkable polymeric component;
      ii) from about 1% to about 75% of at least one liquid-absorbent component comprising a water-absorbent polymer, and
      iii) from 0 to about 5% of a polyfunctional aziridine crosslinking agent;
   b) an optically clear, top layer comprising
      i) from about 0.05% to about 6% of at least one silicone surfactant having the formula:

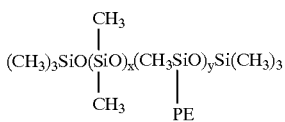

wherein x is an integer from about 40 to about 200, and y is an integer from about 3 to about 15, and PE represents the formula

wherein m is an integer of from 1 to about 40, and n is an integer of from 0 to 40 minus m and Z is hydrogen or an alkyl radical having from about 1 to about 10 carbon atoms, and ii) from about 14% to about 93% of a hydroxycellulose or substituted hydroxycellulose polymer, and iii) from 0 to about 6% of at least one additional ink-receptive polymer selected from the group consisting of poly(vinylalcohol), polyacrylamide, gelatin, poly(vinylpyrrolidone), partially hydrolyzed poly(vinyl alcohol) poly(vinyl pyrrolidone-co-vinyl acetate), polyvinylpyridinium halide, and polyvinylmethylethers.

8. An ink-jet recording sheet according to claim 7 wherein said hydroxycellulose is selected from the group consisting of hydroxypropylmethyl cellulose, and hydroxypropylethylcellulose.

9. An ink-jet recording sheet according to claim 7 wherein said additional ink-receptive polymer comprises a blend containing at least one of poly(vinylalcohol), and poly(vinyl pyrrolidone).

10. An ink-jet recording sheet according to claim 7 wherein said coating further comprises a metal chelate wherein said metal is selected from the group consisting of titanium, aluminum and zirconium.

11. An ink-jet recording sheet according to claim 7, wherein said crosslinking agent is a polyfunctional aziridine selected from the group consisting of tris($\beta$-(N-aziridinyl) propionate), pentaerythritol-tris-($\beta$-(N-aziridinyl) propionate), and trimethylol propane-tris-($\beta$-(N-methylaziridinyl propionate).

12. An ink-jet recording sheet according to claim 7 wherein said film substrate is transparent.

13. An ink-jet recording sheet according to claim 7 wherein said film substrate is transparent.

14. An ink-jet recording sheet comprising a substrate having coated on at least one major surface thereof a two-layer coating comprising a) an absorptive bottom layer comprising
   i) from about 25% to about 99% of one crosslinkable polymeric component;
   ii) from about 1% to about 75% of at least one liquid-absorbent component comprising a water-absorbent polymer, and
   iii) from 0 to about 5% of a polyfunctional aziridine crosslinking agent;
b) an optically clear, top layer comprising
   i) from about 0.05% to about 6% of at least one silicone surfactant having the formula:

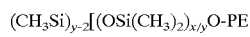

wherein x is an integer from about 40 to about 200, and y is an integer from about 3 to about 15, and PE represents the formula

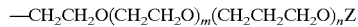

wherein m is an integer of from 1 to about 40, and n is an integer of from 0 to 40 minus m and Z is hydrogen or an alkyl radical having from about 1 to about 10 carbon atoms, and ii) from about 14% to about 93% of a hydroxycellulose or substituted hydroxycellulose polymer, and iii) from 0 to about 6% of an additional ink-receptive polymer selected from the group consisting of poly (vinylalcohol), polyacrylamide, gelatin, poly (vinylpyrrolidone), partially hydrolyzed poly(vinyl alcohol) poly(vinyl pyrrolidone-co-vinyl acetate), polyvinylpyridinium halide, and polyvinylmethylethers.

15. An ink-jet recording sheet according to claim 14 wherein said hydroxycellulose is selected from the group consisting of hydroxypropylmethyl cellulose and hydroxypropylethylcellulose.

16. An ink-jet recording sheet according to claim 14 wherein said additional ink-receptive polymer comprises a blend containing at least one of poly(vinylalcohol), and poly(vinyl pyrroldione).

17. An ink-jet recording sheet according to claim 14 wherein said coating further comprises a metal chelate wherein said metal is selected from the group consisting of titanium, aluminum and zirconium.

18. An ink-jet recording sheet according to claim 14, wherein said crosslinking agent is a polyfunctional aziridine selected from the group consisting of tris($\beta$-(N-aziridinyl) propionate), pentaerythritol-tris-($\beta$-(N-aziridinyl) propionate), and trimethylol propane-tris-($\beta$-(N-methylaziridinyl propionate).

* * * * *